F. J. FELDT.
CORRUGATED CULVERT.
APPLICATION FILED JUNE 20, 1910.
1,001,378.
Patented Aug. 22, 1911.
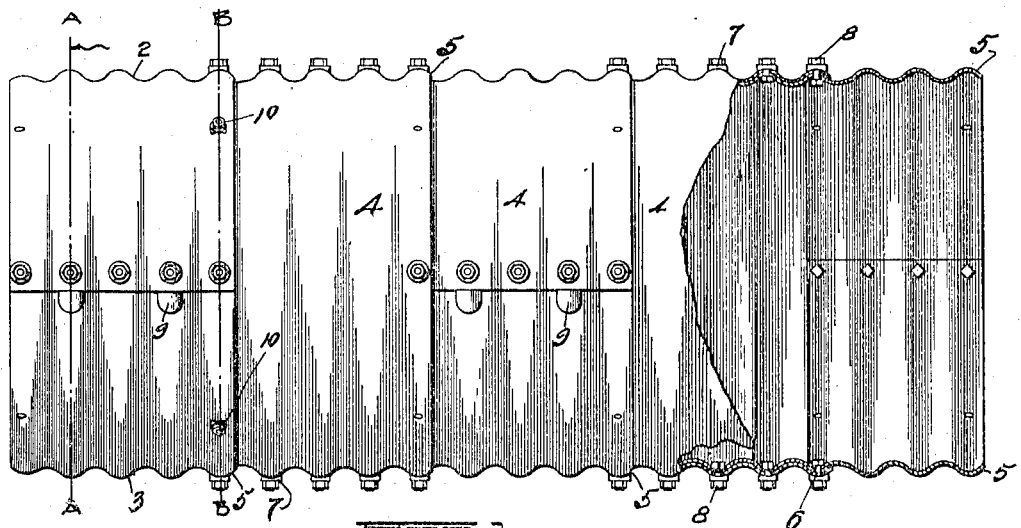
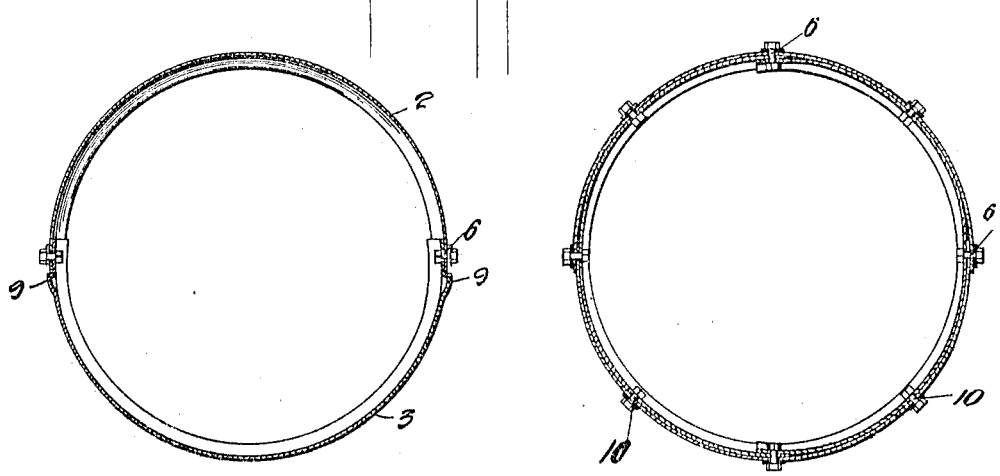
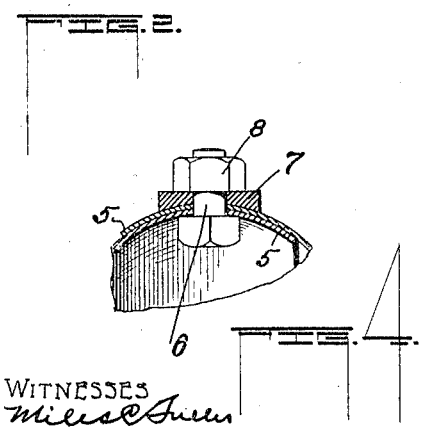
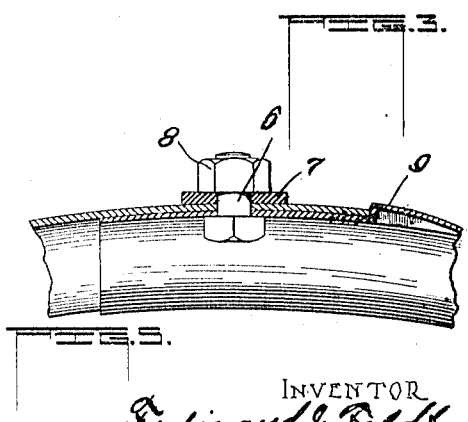
WITNESSES
BY
INVENTOR
Ferdinand J. Feldt
ATTY.

UNITED STATES PATENT OFFICE.

FERDINAND J. FELDT, OF PEORIA, ILLINOIS.

CORRUGATED CULVERT.

1,001,378.

Specification of Letters Patent.   Patented Aug. 22, 1911.

Application filed June 20, 1910.   Serial No. 567,806.

*To all whom it may concern:*

Be it known that I, FERDINAND J. FELDT, a citizen of the United States, residing at Peoria, in the county of Peoria and State of Illinois, have invented certain new and useful Improvements in Corrugated Culverts; and I do hereby declare that the following is a full, clear, and exact description of the invention, which will enable others skilled in the art to which it appertains to make and use the same.

My invention relates to culverts, and more particularly to corrugated culverts used generally as conduits and for drainage purposes.

The object of my invention is to construct a tube of corrugated metal made up of half sections adapted to be united in break-joint relation to make up the complete culvert, and my invention lies in providing stops upon the lower sections adapted as a support for the edges of the upper half sections to facilitate in joining the sections together and to take the strain off of the rivets or bolts which are employed to join the meeting lapped portions together.

My invention consists essentially in forming stops upon raised portions of corrugations at intervals throughout the length of each section.

In the drawings. Figure 1 is a side elevation of a culvert formed by the uniting of corrugated sections in accordance with my invention, with a portion broken away for the purpose of illustrating the manner of joining certain sections and half sections together; Fig. 2 is a vertical sectional view on the line A—A of Fig. 1, looking in the direction indicated by the arrow; Fig. 3 is a vertical section through the line B—B of Fig. 1; Fig. 4 is a detail view showing the manner of joining the meeting sections and also showing the application of a washer; and Fig. 5 is a detail view taken at right angles from that shown in Fig. 4 and showing also the manner of joining the parts and the use of the washer and also a stop or lug formed in the metal of certain sections.

Referring to the drawings, 2 and 3 are corrugated metal half sections semicircularly formed, the sections when joined forming the complete section which I will indicate as 4.

5 refer to terminal corrugations which, in carrying out my invention, are formed with their outer edges turned inwardly. This same formation is provided in each complete section. The terminating corrugations of each section are joined in the manner shown in Fig. 4, in which it is shown that a bolt as 6 is passed through matching perforations of the respective half sections, and a washer 7 formed with a longitudinal semicircular face conforming to the shape of the corrugations applied in the manner shown, and a nut 8 is then screwed down upon the washer to hold the parts together. Any desired number of such bolts and washers may be applied to join the matching edges of the respective half sections and the interengaging corrugations of each whole section.

To facilitate the joining of the half sections together, the lugs 9 are provided which are formed by striking up and pressing outwardly the metal to form such lugs upon at least two of the corrugations of each half section, such lugs being provided upon each end of one of the half sections that make up each whole section. The lugs are provided to form a rest for the edges of the matching half sections so that as the sections are placed in position to be bolted together, the edge of the section will rest upon the lugs, and with the assistance of the matching corrugations of the respective sections coming together, will result in bringing the perforations in the half sections in perfect alinement so that the bolts may readily pass therethrough and then the washers and nuts may be applied readily.

Each complete section of the desired culvert having been formed by the union of two half sections, the whole sections may be joined together by applying bolts, and washers as illustrated in the joining of the first two sections at the left hand of Fig. 1. In joining the sections, however, they are joined in break joint relation, as shown. Bolts and nuts may be applied at intermediate points between the joining of the overlapped sections with the adjacent section, as at 10, shown at the left of Fig. 1. Perforations are shown at intermediate points in the other sections but no bolts are shown applied.

I have found in practice that it is well to supplement the bolts or rivets used to join the longitudinal lapping seams by the provision of stops or raised portions that will take the force of pressure from above the culvert section 2 and have found in practice that it is impossible to bend the corrugated body to form a shoulder without breaking the galvanizing, which virtually destroys the culvert, as galvanizing is the vital life-preserving element thereof. Furthermore, I have found that striking up portions of the metal, by perforating it, weakens the structure and is generally unsatisfactory from a manufacturing point of view, and lessens also the desirability and utility of the structure. I therefore provide non-perforate raised portions or shoulders which are produced by striking up the metal at the ridges of corrugations at intervals the length of each section, it being necessary to provide only two such raised portions or shoulders on each section. I have found that the portions may be raised in this manner without destroying the galvanizing.

I have arranged for constructing the sections in break jointing relation with a view of strengthening the complete structure when formed into a culvert.

The culvert is very readily put together at the place where it is desired to use it, as the bolts for joining the half sections together may be readily applied as the corrugations and the lugs 9 bring the parts into proper adjustment to aline the perforations of the metal to permit the ready placing of the bolts to secure the half sections together. Likewise, the forming of each complete section of two half sections in break joint relation facilitates very materially in the joining of the complete sections together, as will readily appear without detail description.

What I claim is:

In a metal culvert, in combination, upper and lower corrugated sections adapted to be united in break-joint relation to form a continuous tube and non-perforate raised portions struck up from the raised portions of corrugations of the lower sections adjacent their longitudinal edges to form supports for the edges of the upper sections for the purpose of reinforcing the longitudinal joint and for aiding in the proper alinement of perforations to accommodate the insertion of bolts or rivets substantially as described.

In testimony whereof I have affixed my signature, in presence of two witnesses.

FERDINAND J. FELDT.

Witnesses:
W. V. TEFFT,
JACOB A. HARMAN.

Copies of this patent may be obtained for five cents each, by addressing the "Commissioner of Patents Washington, D. C."